United States Patent [19]

Butcher

[11] 4,082,106

[45] Apr. 4, 1978

[54] AIR ELIMINATOR VALVE

[75] Inventor: Alan George Butcher, Bracknall, England

[73] Assignee: Dresser Europe S. A., Brussels, Belgium

[21] Appl. No.: 672,531

[22] Filed: Mar. 31, 1976

Related U.S. Application Data

[63] Continuation of Ser. No. 510,867, Sep. 30, 1974, abandoned.

[51] Int. Cl.² .............................................. F16K 31/18
[52] U.S. Cl. ..................................... 137/174; 137/202; 137/451; 251/DIG. 2
[58] Field of Search ....................... 137/202, 451, 174; 251/294, DIG. 2

[56] References Cited

U.S. PATENT DOCUMENTS

| 2,675,025 | 4/1954 | Wynkorp | 137/451 X |
|---|---|---|---|
| 2,977,972 | 4/1961 | Billeter | 137/451 X |
| 3,473,531 | 10/1969 | Tatbam | 251/294 X |
| 3,889,706 | 6/1975 | Wallen | 137/451 X |

Primary Examiner—Alan Cohan
Attorney, Agent, or Firm—Wenderoth, Lind & Ponack

[57] ABSTRACT

An air eliminator valve for automatically collecting and venting air and other gases included in flowing liquid. The valve has a chamber in which air collects, a float in the chamber and a vent valve at the top operated by the float to vent the chamber when the liquid level falls. The vent valve has a convex or concave seat with apertures therein and is sealed by a flexible diaphragm which is peeled progressively from the seat to open the valve. The diaphragm may be annular and fixed at its outer periphery, being flexed by a coupling at its center, or may be fixed at the center and flexed by a coupling at its periphery.

6 Claims, 3 Drawing Figures

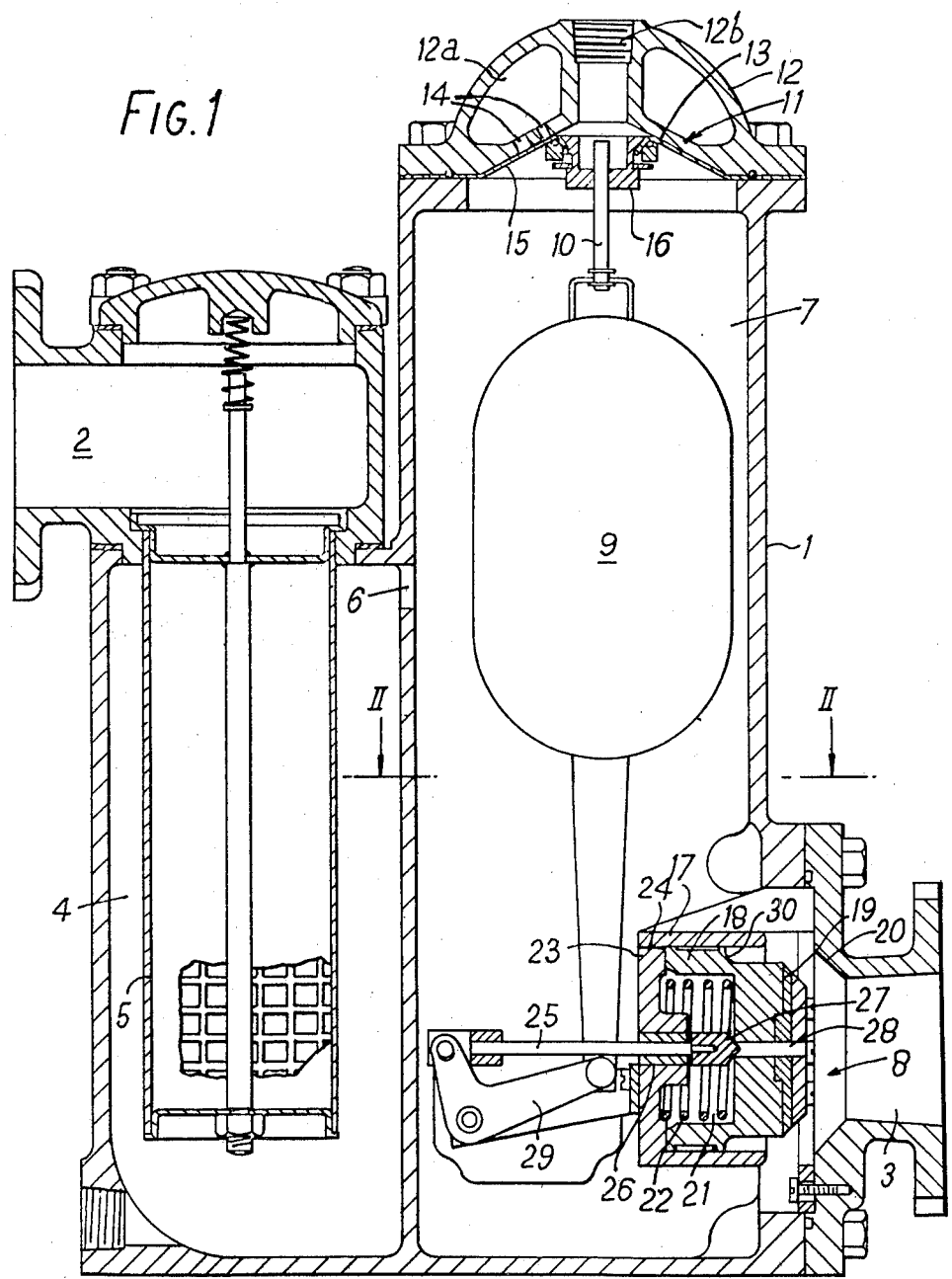

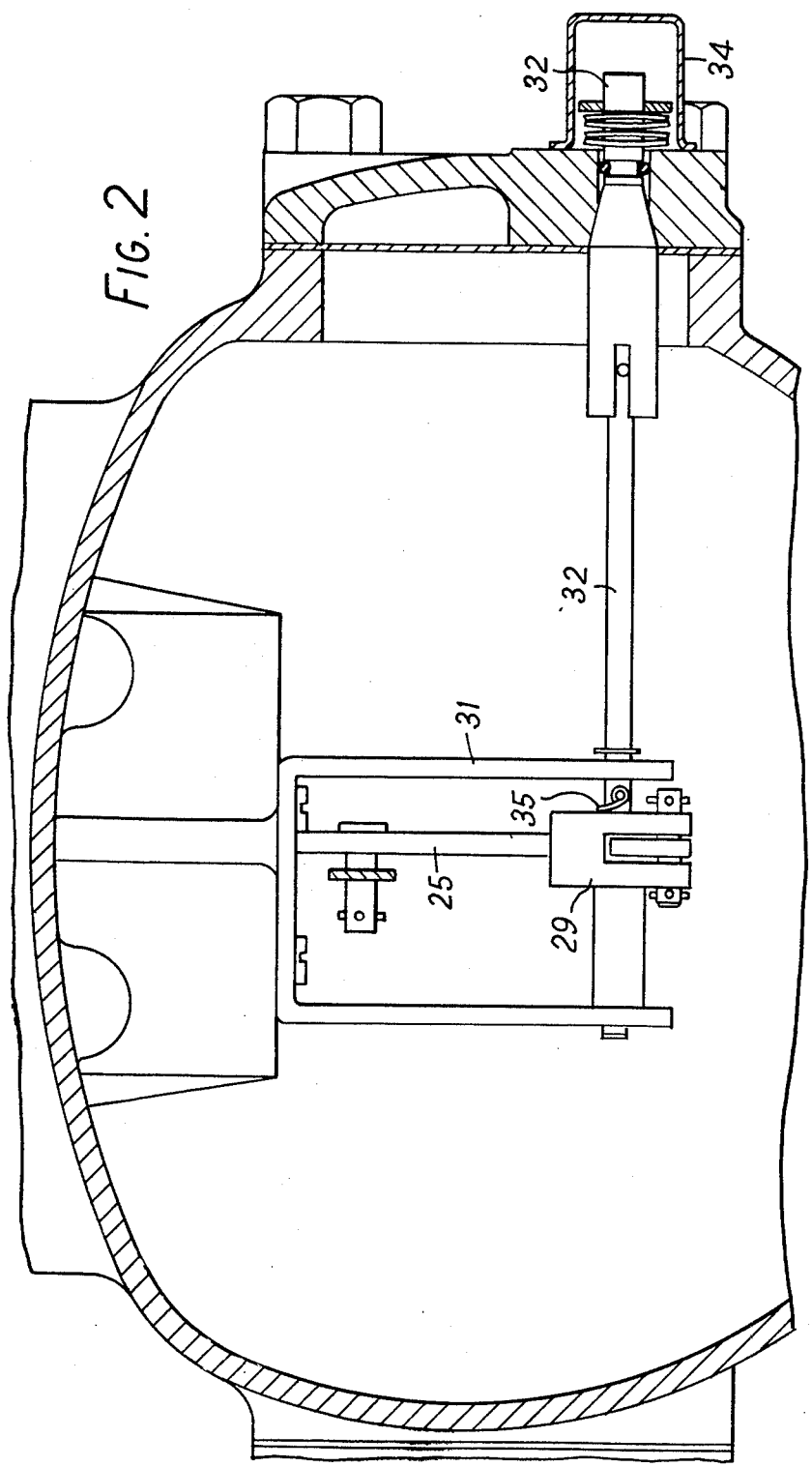

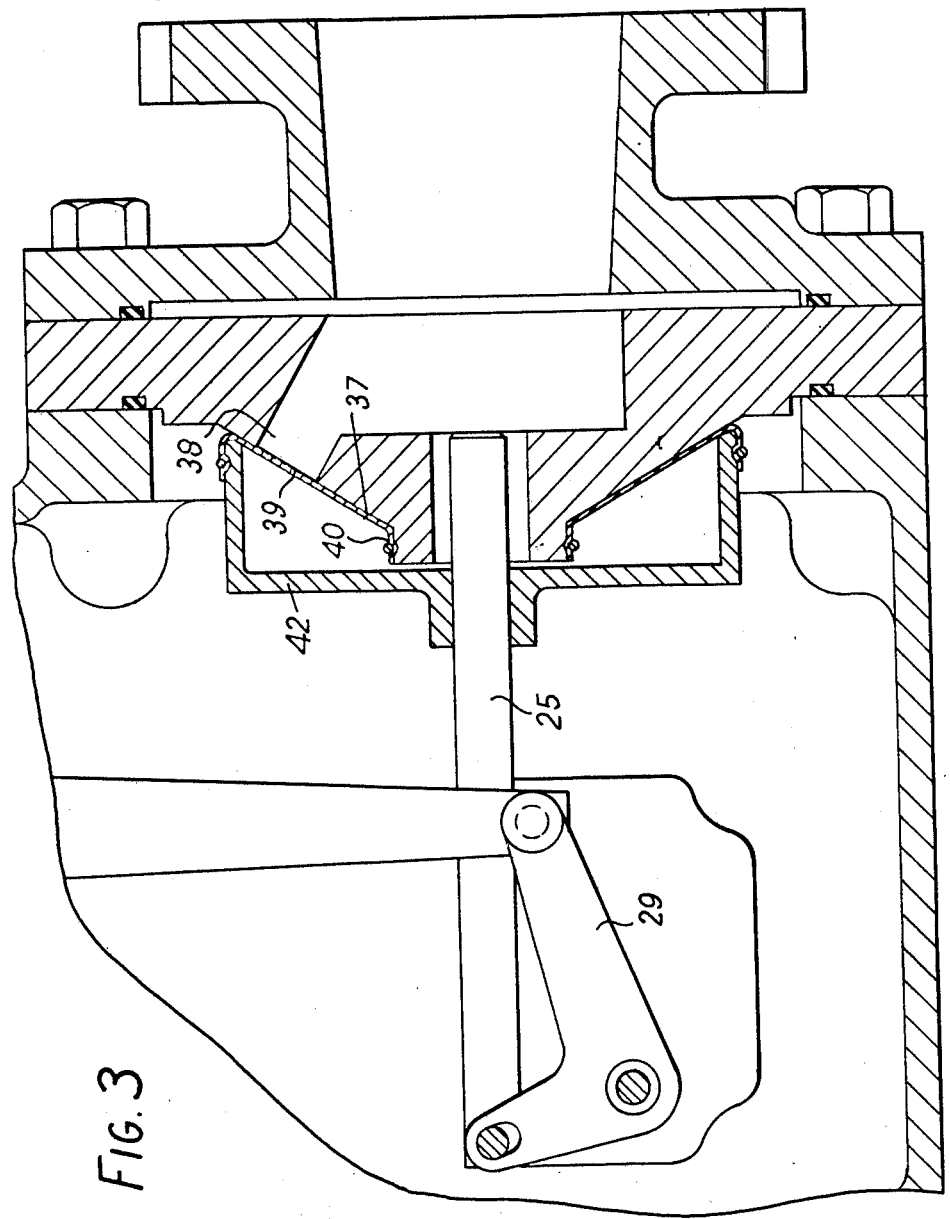

AIR ELIMINATOR VALVE

This is a continuation of application Ser. No. 510,867, filed Sept. 30, 1974, now abandoned.

The invention relates to an air eliminator valve for eliminating air and other gases included in a liquid flowing in a liquid supply line. Typical application for the invention lies in liquid fuel pumping and dispensing systems where it is necessary to eliminate gases from the liquid before the liquid passes through a flow meter for measuring the volume of liquid flowing. The presence of substantial amounts of air and other gases in the liquid being measured would result in inaccuracies.

An air eliminator valve may comprise a housing which defines a chamber for collecting the air and a float in the chamber coupled to an air venting valve at the top of the chamber. When air collects in the chamber the liquid in the chamber falls to a certain level and the float operates the air venting valve to vent the air. When the liquid rises as a result of the venting the float rises to shut off the valve. For this purpose it is possible to use a pilot-controlled valve which includes a control chamber operating a piston which opens and closes the valve, the control chamber being coupled to the upstream and down-stream sides of the valve to close and open the valve respectively by means of a small pilot valve operated by the float. Such pilot-controlled valves are composed of many moving parts and having sliding seals. The inherent nature of the design of such valves makes it difficult to ensure reliable operation for an extended period. The valves operate in an on/off manner which is not always desirable. Furthermore, when there is a high differential pressure across the air release valve it is possible that the weigh of the float is insufficient to operate the valve. Finally, the valves are expensive. The present invention seeks to provide an air eliminator valve which includes an improved air venting valve.

According to the invention there is provided an air eliminator valve comprising a housing, a chamber defined by the housing, an inlet and an outlet to the chamber for coupling the chamber to a liquid supply line, the valve being disposed in use so that air collects in the upper part of the chamber, a float in the chamber, an air release valve at the top of the chamber, the air release valve comprising a concave or convex valve seat with vent apertures therein; a flexible diaphragm which is normally seated against the valve seat to seal the vent apertures; and a coupling between the diaphragm and the float whereby when the float falls it peels the diaphragm away from the seat to uncover the vent apertures and allow venting of the air.

With a concave valve seat the diaphragm is fixed at its outer edge and is coupled to the float at its centre. With a convex valve seat the diaphragm is fixed at its centre and coupled to the float at its outer edge. The shape of the valve seat may be part conical or part spherical, for example. While it is possible for the diaphragm to be cut away in the regions not corresponding to vent apertures in the valve seat it is preferred for efficient sealing to arrange that the diaphragm is continuous over the valve seat area. In a preferred embodiment of the invention the diaphragm is basically annular. Preferably the diaphragm is made of rubberised fabric.

An air release valve of the kind described has few moving parts, is simple to manufacture and offers good sealing properties. The peeling action of the diaphragm provides a progressive opening of the vent apertures. The apertures may be shaped to exaggerate this progressive characteristic, being smaller at the inner or outer part of the seat depending on whether the seat is concave or convex.

Air eliminator valves sometimes require the facility for a liquid shut-off valve to be operated automatically by the float. Hitherto, it has been proposed to use a butterfly valve in the liquid outlet for this purpose, the butterfly valve being coupled to the float. However, such a valve offers a poor seal and a preferred feature of the present invention is to provide a float-operated liquid shut-off valve of improved design.

In one embodiment of the invention there is provided a liquid shut-off valve for the liquid outlet of the housing, the shut-off valve comprising a pilot-controlled valve of the kind described above, the pilot valve being coupled by a linkage to the float.

In another embodiment of the invention the liquid shut-off valve comprises a second diaphragm valve having a diaphragm which seats on a concave or convex seat with apertures therein, the float being coupled to the diaphragm to peel the diaphragm away from the seat as the float rises so as to allow the liquid to flow.

Another feature of the present invention is the provision of means actuable from outside the housing to adjust the height of the float. In this way the point at which the air release valve operates can be adjusted without dismantling the air eliminator valve. To this end there is preferably provided a linkage coupled to the float, the linkage being mounted in a frame fixed in the housing and there being a control rod operable from outside the housing and passing through the wall of the housing in sealed relationship, the control rod having fixed thereon one end of a biasing spring, the other end of which is fixed to the linkage. By movement of the control rod the force exerted by the spring on the linkage and therefore on the float is adjusted, so adjusting the height of the float.

Preferably the housing includes a filter mounting which carries a filter through which the liquid flows before passing into the inlet of the float chamber.

The invention will further be described with reference to the accompanying drawings, of which:

FIG. 1 is a cross-sectional elevation of an air eliminator valve in accordance with the invention;

FIG. 2 is a part section taken at A—A of FIG. 1; and

FIG. 3 is a part sectional elevation of a modification of the valve of FIGS. 1 and 2 showing an alternative liquid shut-off valve.

Referring to FIG. 1 the air eliminator valve comprises a housing 1 having a liquid inlet 2 and a liquid outlet 3 for coupling to a liquid supply line. Liquid entering the inlet 2 passes into a filter chamber 4 which includes a cylindrical mesh filter 5 through which the liquid passes. From the filter chamber 4 the liquid passes beneath a wall 6 to a float chamber 7. From the float chamber the liquid passes to the outlet 3 through a shut-off valve 8 which is normally open.

Air and gases contained in the liquid collect at the top of the float chamber 7. A float 9 floats in the liquid in the chamber and assumes a height dependent upon the level of liquid in the chamber. As the air and gases accumulate at the top of the float chamber the liquid level falls and the float falls. The float is coupled by a coupling 10 to an air release valve 11 so that when the float has fallen sufficiently the valve 11 is opened to vent the accumulated air to atmosphere via a hollow valve cap 12. The cap 12 presents a concave part-conical valve seat 13 around which is distributed a series of vent apertures 14. The valve is sealed by an annular flexible diaphragm 15 which seats against the conical seat 13. The diaphragm 15 is basically annular and the outer edge is clamped between the cap 12 and the body of housing 1. The inner rim of the annular diaphragm is clamped in a clamping ring 16 mounted on coupling rod 10.

As the float level falls the inner part of diaphragm 15 is withdrawn from the conical surface in a peeling action. Thus, the innermost vents 14 are uncovered and air is vented. Air passes from the interior of chamber 7 through apertures (not shown) in ring 16 and through vents 14 to the interior 12a of the cap 12. The interior 12a is vented to atmosphere. A passage 12b is provided to allow access for manually operating valve 11. However, passage 12b is normally sealed. If there is much air present then the float continues to fall and the other apertures 14 are also uncovered, thereby providing more venting. The inner venting apertures are smaller in diameter than the outer venting apertures so that the progressively opening feature of the valve is exaggerated. When the air has been vented then the liquid level will rise and the float will rise to shut-off the valve 11.

If the liquid supply rate drops appreciably or if the flow stops completely then the float will fall to a particularly low level and the float operates to close the shut-off valve 8. Valve 8 is a pilot-controlled valve and comprises a cylinder 17 in which a piston 18 is a sliding fit. The piston 18 has a peripheral rubber seal 19 which is urged against a conical valve seat 20 to close the valve. The piston 18 further includes a control chamber 21 which has within it a biasing coil spring 22.

The rear end of cylinder 15 is closed by a plate 23 which has a small duct 24 therein. A control rod 25 passes through a bushing 26 and operates a pilot valve 27 which seats against the end of a passage 28 in the piston.

When the float 9 falls sufficiently it pushes rod 25 to the right (as seen in the drawing) by means of a linkage comprising a bell crank 29. This has the effect of displacing the piston 18 slightly to the right in the cylinder and thereby allowing access of the liquid on the upstream side of the valve to the control chamber 21 via duct 24 and the clearance between shaft 25 and bush 26. The pressure of this liquid urges the piston 18 fully home to seal on the seat 20.

When the level of float 9 rises again sufficiently the control road 25 is withdrawn to the left and the pilot valve 27 thereby opened to communicate the control chamber 21 with the down stream side of the valve. This unbalances the differential pressure on piston 18 with the result that fluid pressure operating on an annular part 30 pushes the piston to the left and opens the valve.

In order to adjust the operating height of float 9 there is provided a mechanism operable from outside the housing 1. This obviates the necessity to dismantle the valve when resetting of the float level is required for liquids of different specific gravities, for example. The control linkage is shown in FIG. 2 where there is illustrated a frame 31 which is bolted to the housing 1 and on which the bell crank 29 is mounted. A control rod 32 passes through the wall of housing 1, being sealed thereto and is rotatable from outside the housing by means of a knob 33 covered by a protective cover 34.

The bell crank is pivoted on rod 32 but is free to move with respect to rod 32 except that there is a spring 35 which couples the bell crank to the rod, one end of the spring being mounted on the rod and the other being mounted on the bell crank. Thus, rotation of rod 32 changes the spring force exerted on the bell crank 29 and thereby changes the operating height of the float 9.

Referring now to FIG. 3 there is shown an alternative form of cut-off valve for the air eliminator valve of FIG. 1. Except for the valve 8 the air eliminator valve is identical with that of FIG. 1. In FIG. 3, the liquid cut-off valve is shown as comprising a convex conical valve seat 37 which has three apertures, one of which is shown at 38. A rubberised fabric diaphragm 39 seats against the conical valve seat 37 to shut the valve. The diaphragm is generally annular and is fixed at its centre at 40 to the valve seat. The outer edge of the diaphragm is fixed to the lip of a cup 42 which is mounted on shaft 25. Whe the float is low the shaft 25 is pushed to the right and the valve is sealed. As the float rises the shaft 25 is withdrawn to the left and the cup pulls on the diaphragm 39 so that it is progressively peeled away from the conical seat 37 to open the valve.

The air relase valve 11 described with reference to FIG. 1 is designed to be pressure balanced while maintaining a complete shut off under closed conditions and giving a progressive opening to cope with various amounts of air. The centre ring 16 immediately above the float creates a seat even though the pressure above and below it is completely balanced. Once the float has sensed the presence of air and allowed this seat to open, further opening and therefore rate of emission of air or vapour is controlled by a peeling action of the conical diaphragm which tends to invert as the float drops. However, where the diaphragm is not pulled away from the venting apertures a seal is maintained by the action of the pressure within the body.

It will be apppreciated that the invention is not restricted to the details of the embodiment described with reference to the accompanying drawings. For example, two types of diaphragm valves are shown in FIGS. 1 and 3 respectively, that of FIG. 1 being concave and that of FIG. 3 being convex. It will be apparent that both valves can be of the concave or convex type or the air release valve may be of the convex type and the shut-off valve of the concave type. However, it is preferred to make the shut-off valve a convex type since this gives a better opening area.

I claim:

1. An air eliminator valve comprising a housing, a chamber defined by said housing and having an inlet and an outlet for coupling the chamber to a liquid supply line, the valve being disposed in use so that air collects in the upper part of the chamber, a float in the chamber movable along the axis of the chamber which extends through the top of the chamber, an air release valve at the top of the chamber, the air release valve comprising a valve seat having a seating surface generated by a generatrix rotated 360° around said axis and intersecting said axis and extending outwardly therefrom with the portion of the generatrix intersecting said axis being at an angle to said axis, said valve seat surface having thruflow apertures therein, a flexible diaphragm of generally annular configuration for superposed placement against the seating surface of the valve seat to seal the vent apertures, means securing one end of said diaphragm while leaving the other end free and a coupling connecting the free end of the diaphragm with the float, whereby when the float falls it peels the diaphragm away from its placement position against the seat surface to uncover the vent apertures and allow venting of the air.

2. An air eliminator valve as claimed in claim 1 wherein the valve seat is concave, the diaphragm is secured at its outer edge and the coupling is connected to the centre of the diaphragm.

3. An air eliminator valve as claimed in claim 2 wherein the vent apertures are smaller in the inner part of the valve seat than in the outer part.

4. An air eliminator valve as claimed in claim 1 further comprising a liquid shut-off valve for the liquid outlet of the housing, the shut-off valve being a pilot-controlled valve having a control chamber, a piston in the control chamber, the piston being effective to open and close the valve, means for coupling the control chamber to the upstream and downstream sides of the valve, and a pilot valve coupled to the float and operated thereby to control the pressure applied to the control chamber.

5. An air eliminator valve as claimed in claim 1 further comprising a liquid shut-off valve for the liquid outlet of the housing, the shut-off valve comprising a second concave or convex valve seat with apertures therein, a second flexible diaphragm seated against the second valve seat to seal the apertures, and a second coupling between the float and the second diaphragm whereby when the float rises it peels the second diaphragm away from the second valve seat to uncover the apertures in the second valve seat and allow flow of liquid.

6. An air eliminator valve as claimed in claim 5 wherein the second valve seat is convex, the second diaphragm is fixed at the centre and second coupling is connected to the outer edge of the second diaphragm.

* * * * *

UNITED STATES PATENT AND TRADEMARK OFFICE
CERTIFICATE OF CORRECTION

PATENT NO. : 4,082,106
DATED : April 4, 1978
INVENTOR(S) : Alan George Butcher

It is certified that error appears in the above-identified patent and that said Letters Patent are hereby corrected as shown below:

On the front page add:

"[30]        Foreign Application Priority Data
    October 3, 1973    Great Britain...........46263/73"

Signed and Sealed this

Sixth Day of February 1979

[SEAL]

Attest:

RUTH C. MASON
Attesting Officer

DONALD W. BANNER
Commissioner of Patents and Trademarks